US010556291B2

(12) United States Patent
Hassan

(10) Patent No.: US 10,556,291 B2
(45) Date of Patent: *Feb. 11, 2020

(54) HIGH PERFORMANCE CONTACT TIP AND NOZZLE ASSEMBLY FOR AN ARC WELDING APPARATUS

(71) Applicant: Victor Equipment Company, Denton, TX (US)

(72) Inventor: Khalid Hassan, Denton, TX (US)

(73) Assignee: Victor Equipment Company, Denton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,802

(22) Filed: Jan. 10, 2018

(65) Prior Publication Data

US 2018/0133827 A1    May 17, 2018

Related U.S. Application Data

(62) Division of application No. 14/540,798, filed on Nov. 13, 2014, now Pat. No. 9,889,519.

(Continued)

(51) Int. Cl.
*B23K 9/16* (2006.01)
*B23K 9/28* (2006.01)
(Continued)

(52) U.S. Cl.
CPC .............. *B23K 9/295* (2013.01); *B21D 19/00* (2013.01); *B23K 9/173* (2013.01); *B23K 9/285* (2013.01); *B23K 9/32* (2013.01)

(58) Field of Classification Search
CPC . B23K 9/29; B23K 9/32; B23K 9/285; B23K 9/287; B23K 9/291; B23K 9/295
(Continued)

(56) References Cited

U.S. PATENT DOCUMENTS 1,828,459 A    10/1931  Cornell et al.
1,835,179 A    12/1931  Rue et al.
(Continued)

FOREIGN PATENT DOCUMENTS

CN    201902729 U    7/2011
DE       231519 A1    1/1986
(Continued)

OTHER PUBLICATIONS

Australian Examination Report from AU 2014348493 dated Sep. 2, 2016.

(Continued)

*Primary Examiner* — Michael G Hoang
(74) *Attorney, Agent, or Firm* — Edell, Shapiro & Finnan, LLC

(57) ABSTRACT

A consumable assembly for use in an arc welding apparatus is provided that includes a nozzle assembly having a nozzle body, an insulator disposed within the nozzle body, and a nozzle insert disposed within the insulator. The nozzle insert includes an internal gas diverter. A contact tip is disposed within the nozzle assembly and includes at least one aperture extending from an exterior portion to an internal cavity, an exit orifice, a distal end face, and an exterior surface extending between the at least one aperture and the distal end portion of the contact tip. The internal gas diverter directs a flow of shield gas exiting the at least one aperture along the exterior surface of the contact tip, and a principal distance from the at least one aperture to the distal end face is varied to adjust the flow of the shield gas for improved cooling.

20 Claims, 8 Drawing Sheets

Related U.S. Application Data

(60) Provisional application No. 61/903,950, filed on Nov. 13, 2013, provisional application No. 62/053,784, filed on Sep. 22, 2014.

(51) Int. Cl.
| | | |
|---|---|---|
| *B23K 9/12* | (2006.01) | |
| *B23K 9/32* | (2006.01) | |
| *B23K 9/29* | (2006.01) | |
| *B23K 9/173* | (2006.01) | |
| *B21D 19/00* | (2006.01) | |

(58) Field of Classification Search
USPC ............ 219/137.31, 137.42, 137.44, 137.61, 219/137.62, 137.63
See application file for complete search history.

(56) References Cited

U.S. PATENT DOCUMENTS

| | | | |
|---|---|---|---|
| 2,427,894 | A | 9/1947 | Benner |
| 2,432,639 | A | 12/1947 | Webster et al. |
| 2,438,292 | A | 3/1948 | Linker et al. |
| 2,544,801 | A | 3/1951 | Muller |
| 2,944,525 | A | 7/1960 | Fagge |
| 3,018,360 | A | 1/1962 | Engel et al. |
| 3,629,547 | A | 12/1971 | Kester et al. |
| 3,783,233 | A | 1/1974 | dal Molin |
| 4,105,891 | A | 8/1978 | Hill et al. |
| 4,158,763 | A | 6/1979 | Moerke |
| 4,158,765 | A | 6/1979 | Moerke |
| 4,467,175 | A | 8/1984 | Reeh et al. |
| 4,554,432 | A | 11/1985 | Radoff |
| 4,994,707 | A | 2/1991 | Stark |
| 5,491,321 | A | 2/1996 | Stuart |
| 5,669,556 | A | 9/1997 | Yoshida |
| 5,974,917 | A | 11/1999 | Way |
| 5,998,760 | A | 12/1999 | Kunz |
| 7,576,300 | B2 | 8/2009 | Giese |
| 7,905,741 | B1 | 3/2011 | Wade et al. |
| 2004/0026394 | A1 | 2/2004 | Giese |
| 2005/0109738 | A1 | 5/2005 | Hewett et al. |
| 2007/0062922 | A1 | 3/2007 | Zamuner |
| 2007/0108173 | A1 | 5/2007 | Zamuner |
| 2007/0210049 | A1 | 9/2007 | Dingeldein |
| 2008/0035623 | A1 | 2/2008 | Hutchison |
| 2008/0035626 | A1 | 2/2008 | Christopher et al. |
| 2008/0188093 | A1 | 8/2008 | Jaeger |
| 2008/0290074 | A1 | 11/2008 | Speker et al. |
| 2009/0050609 | A1 | 2/2009 | Berger et al. |
| 2010/0123311 | A1 | 5/2010 | Church |
| 2011/0000893 | A1 | 1/2011 | Blankenship et al. |
| 2011/0006522 | A1 | 1/2011 | Bichler et al. |
| 2012/0125904 | A1* | 5/2012 | Lee .................... B23K 9/26 219/137.61 |
| 2013/0126505 | A1* | 5/2013 | Hassan .............. B23K 9/173 219/137.44 |
| 2013/0134143 | A1 | 5/2013 | Hassan et al. |
| 2014/0263253 | A1 | 9/2014 | Meess et al. |
| 2015/0273616 | A1* | 10/2015 | Cooper .............. B23K 9/173 219/137.42 |
| 2017/0173722 | A1* | 6/2017 | Takemura .......... B23K 9/173 |

FOREIGN PATENT DOCUMENTS

| | | |
|---|---|---|
| JP | S60-71482 U | 5/1985 |
| JP | S60-170574 A | 9/1985 |
| JP | H07256462 A | 10/1995 |
| JP | 2004276084 A | 10/2004 |
| JP | 2009-142850 A | 7/2009 |
| KR | 2012-0000369 U | 1/2012 |
| KR | 2012-0081460 A | 7/2012 |
| WO | 0198013 A1 | 12/2001 |
| WO | 2004-322127 A | 11/2004 |
| WO | 2013157036 A1 | 10/2013 |

OTHER PUBLICATIONS

Australian Examination Report from AU 2014348569 dated Aug. 19, 2016.
Australian Examination Report No. 1 from AU 2014348615 dated Aug. 19, 2016.
Australian Examination Report No. 1 from AU 2014348622 dated Oct. 26, 2016.
Australian Examination Report No. 1 from AU 2014348698 dated Sep. 2, 2016.
Australian Examination Report No. 1 from AU 2014348701 dated Aug. 17, 2016.
Australian Examination Report No. 2 from AU 2014348622 dated Sep. 29, 2017.
Australian Examination Report No. 2 from AU 2014348615 dated Jan. 3, 2017.
Australian Examination Report No. 2 from AU 2014348698 dated Jan. 4, 2017.
Australian Examination Report No. 2 from AU 2014348701 dated Jan. 13, 2017.
Communication pursuant to Article 94(3) EPC from EP 14 812 337.5 dated Jul. 27, 2017.
Communication pursuant to Article 94(3) EPC from EP 14 812 338.3 dated Jul. 27, 2017.
Canadian Office Action No. 1 corresponding to Canadian Application No. 2,928,856 dated Apr. 4, 2017.
Canadian Office Action No. 2 corresponding to Canadian Application No. 2,928,856 dated Dec. 19, 2017.
Canadian Office Action corresponding to Canadian Application No. 2,928,859 dated Dec. 19, 2017.
Canadian Office Action corresponding to Canadian Application No. 2,928,864 dated Mar. 27, 2017.
Canadian Office Action corresponding to Canadian Application No. 2,928,877 dated Mar. 28, 2017.
Canadian Office Action corresponding to Canadian Application No. 2,928,880 dated Mar. 28, 2017.
International Search Report and Written Opinion dated Apr. 14, 2015 for International Application No. PCT/US2014/065577 filed Nov. 13, 2014.
International Search Report and Written Opinion dated Apr. 1, 2015 for International Application No. PCT/US2014065353 filed Nov. 13, 2014.
International Search Report and Written Opinion dated Apr. 1, 2015 for International Application No. PCT/US2014/065566 filed Nov. 13, 2015.
International Search Report and Written Opinion dated Mar. 18, 2015 for International Application No. PCT/US2015/065340 filed Nov. 13, 2015.
International Search Report and Written Opinion dated Apr. 1, 2015 for International Application No. PCT/US2014/065351 filed Nov. 13, 2014.
International Search Report and Written Opinion dated Mar. 6, 2015 for International Application No. PCT/US2014/065504 filed Nov. 13, 2014.
International Search Report and Written Opinion dated Mar. 25, 2015 for International Application No. PCT/US2014/065346 filed Nov. 13, 2014.
International Search Report and Written Opinion dated Apr. 1, 2015 for International Application No. PCT/US2014/065487 filed Nov. 13, 2014.
Canadian Office Action from corresponding Canadian Application No. 2,928,861 dated Apr. 4, 2017.
International Search Report and Written Opinion dated Feb. 29, 2016 for PCT/US2015/060377 filed Nov. 12, 2015.
Office Action from the Brazilian Industrial Property Journal No. 2536 for Brazilian Application No. BR112016010493-5, dated Aug. 13, 2019 with English translation, 6 pages.
Office Action from the Brazilian Industrial Property Journal No. 2536 for Brazilian Application No. BR112013010490-0, dated Aug. 13, 2019 with English translation, 6 pages.
Office Action from the Brazilian Industrial Property Journal No. 2536 for Brazilian Application No. BR112016010488-9, dated Aug. 13, 2019 with English translation, 6 pages.

(56) References Cited

OTHER PUBLICATIONS

Office Action from the Brazilian Industrial Property Journal No. 2536 for Brazilian Application No. BR112016010492-7, dated Aug. 13, 2019 with English translation, 6 pages.
Office Action from the Brazilian Industrial Property Journal No. 2536 for Brazilian Application No. BR112016010486-2, dated Aug. 13, 2019 with English translation, 6 pages.

* cited by examiner

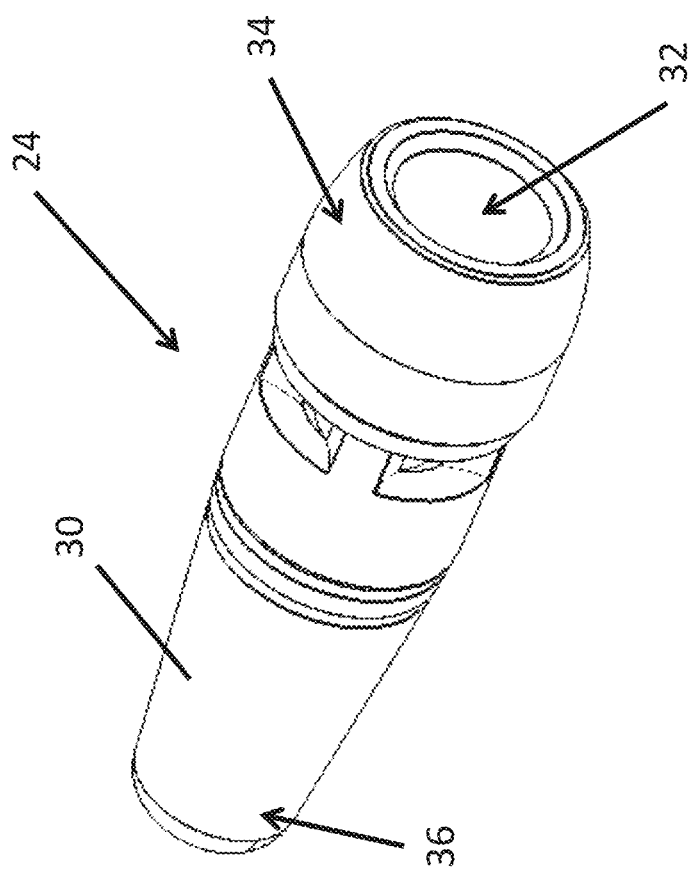
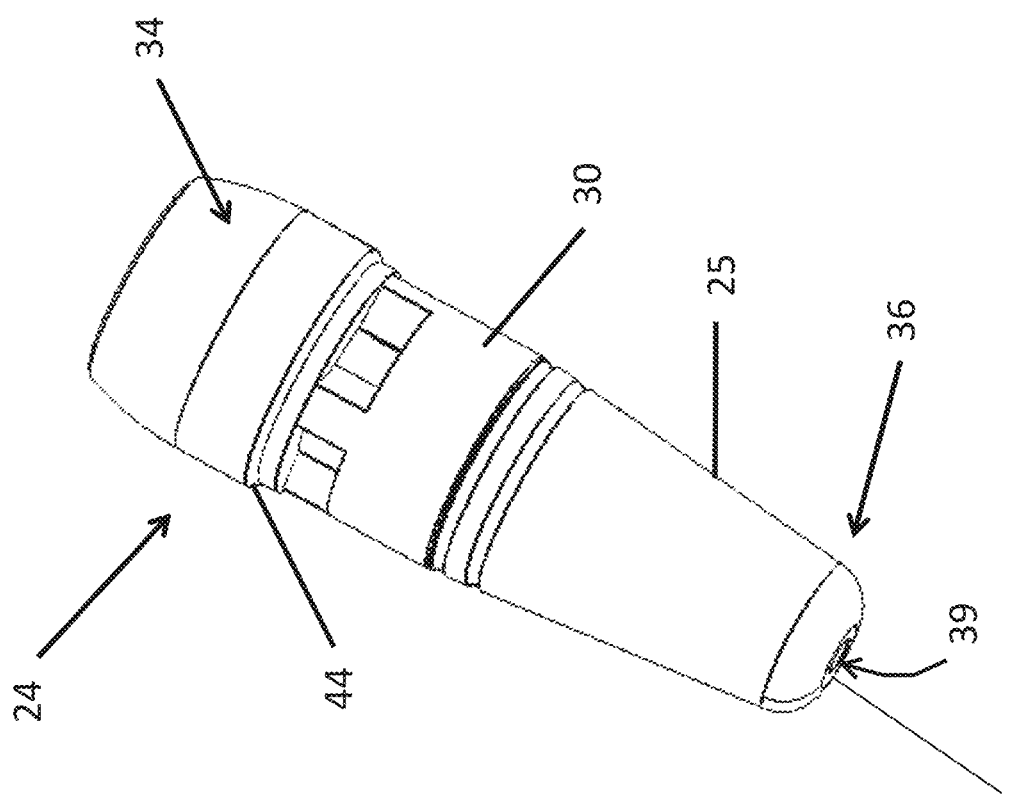
FIG. 2B
FIG. 2A

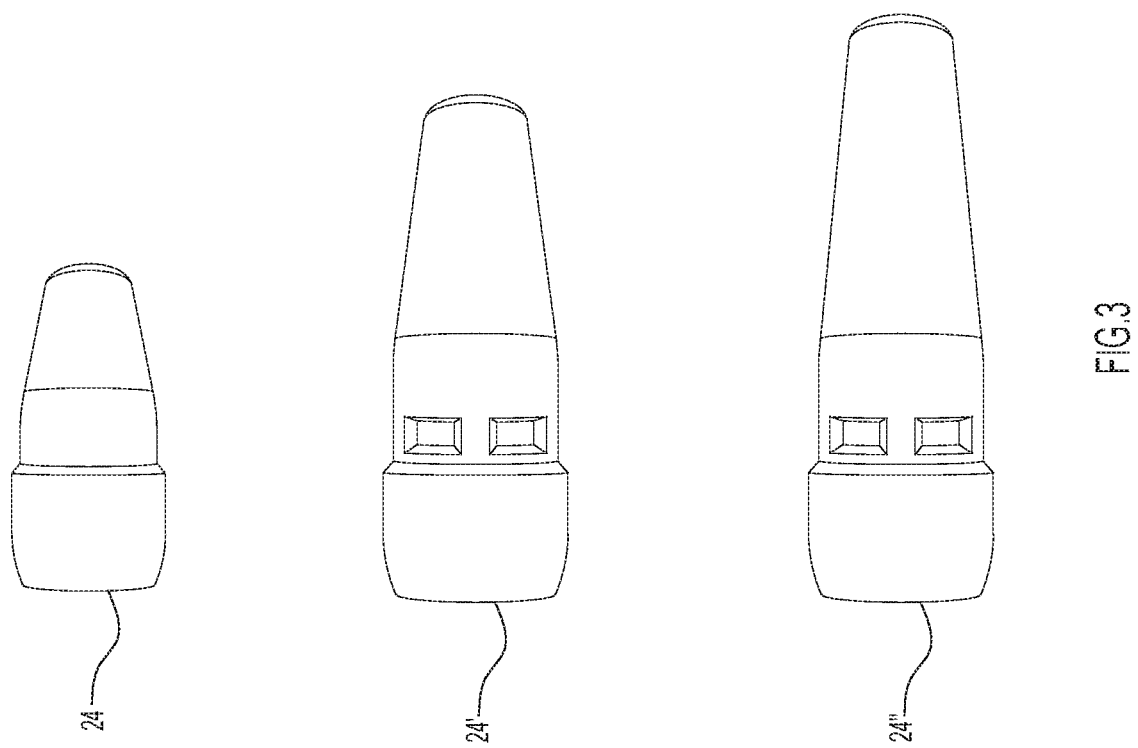

HIGH PERFORMANCE CONTACT TIP AND NOZZLE ASSEMBLY FOR AN ARC WELDING APPARATUS

CROSS-REFERENCE TO RELATED APPLICATIONS

This application is a divisional of U.S. non-provisional application Ser. No. 14/540,798 filed on Nov. 13, 2014, entitled "HIGH PERFORMANCE CONTACT TIP AND NOZZLE ASSEMBLY FOR AN ARC WELDING APPARATUS," which claims the benefit of U.S. provisional application Ser. Nos. 61/903,950 filed on Nov. 13, 2013 and 62/053,784 filed on Sep. 22, 2014. The disclosures of the above applications are incorporated herein by reference in its entirety.

FIELD

The present disclosure relates generally to welding apparatuses, and more particularly to arc welding apparatuses such as Metal Inert Gas (MIG) or Gas Metal Arc Welding (GMAW) welding guns, including consumables for generating a welding arc and diffusing a shield gas.

BACKGROUND

The statements in this section merely provide background information related to the present disclosure and may not constitute prior art.

In an arc welding apparatus, such as Metal Inert Gas (MIG) or Gas Metal Arc Welding (GMAW) welding gun, a welding wire is fed through the welding gun to provide a molten metal pool to join metal workpieces together. An inert gas is directed through the front (distal) end of the welding gun to provide a surrounding layer or blanket of shield gas to protect the molten metal pool from atmospheric contamination. The inert gas is typically a combination of various gases such as argon or helium, among others.

A prior art MIG or GMAW welding gun typically includes a contact tip and a gas diffuser connected to the contact tip. The contact tip has a central bore to guide the welding wire to the workpieces. The contact tip transfers electrical current to the welding wire. The gas diffuser is typically threaded to the contact tip and defines gas passageways that direct the shield gas into a blanket of shield gas around the molten metal pool. The contact tip and gas diffuser are constantly subjected to high heat and are susceptible to wear due to high temperature operation.

SUMMARY

The present disclosure generally provides a contact tip/diffuser configuration for an arc welding apparatus, such as an MIG or GMAW welding gun with an increased consumable life. The various forms of the present disclosure provide a simplified structure, more uniform heat distribution and improved cooling to increase consumable life, among other benefits.

In one form, a consumable assembly for use in an arc welding apparatus is provided that comprises a nozzle assembly having a nozzle body, an insulator disposed within the nozzle body, and a nozzle insert disposed within the insulator. The nozzle insert comprises an internal gas diverter and a seating surface. A contact tip is disposed within the nozzle assembly and defines a shoulder that engages the seating surface of the nozzle insert. The contact tip further comprises a body defining an internal cavity extending from a proximal end portion to a distal end portion, at least one aperture extending from an exterior portion of the body to the internal cavity, an exit orifice extending through the distal end portion of the body, a distal end face, and an exterior surface extending between the at least one aperture and the distal end portion of the body. The internal gas diverter directs a flow of shield gas exiting the at least one aperture along the exterior surface of the contact tip, and a principal distance from the at least one aperture to the distal end face is varied to adjust the flow of the shield gas for improved cooling.

In another form, a method of cooling a contact tip for use in an arc welding apparatus is provided that comprises directing a flow of shield gas into an internal cavity of the contact tip from a proximal end portion to a distal end portion, directing the flow of shield gas through at least one aperture formed through a body of the contact tip, and diverting the flow of shield gas with a component adjacent to the contact tip along an exterior surface of the contact tip toward the distal end portion. The flow of shield gas into the internal cavity through the at least one aperture and around the exterior surface of the contact tip improves the cooling of the contact tip, and a principal distance from the at least one aperture to a distal end face of the contact tip is varied to adjust the flow of the shield gas for improved cooling.

In yet another form, an arc welding apparatus is provided that comprises a handle, a conductor tube attached to the handle, a welding cable that carries welding current, shield gas, and a welding wire from a power source, the welding cable being connected to the handle, and a consumable assembly attached to the conductor tube. The consumable assembly comprises a nozzle assembly having a nozzle body, an insulator disposed within the nozzle body, and a nozzle insert disposed within the insulator. The nozzle insert comprises an internal gas diverter and a seating surface. A contact tip is disposed within the nozzle assembly and defines a shoulder that engages the seating surface of the nozzle insert. The contact tip further comprises a body defining an internal cavity extending from a proximal end portion to a distal end portion, at least one aperture extending from an exterior portion of the body to the internal cavity, an exit orifice extending through the distal end portion of the body, a distal end face, and an exterior surface extending between the at least one aperture and the distal end portion of the body. The internal gas diverter directs a flow of shield gas exiting the at least one aperture along the exterior surface of the contact tip, and a principal distance from the at least one aperture to the distal end face is varied to adjust the flow of the shield gas for improved cooling.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2A is a front perspective view of a contact tip constructed in accordance with the teachings of the present disclosure;

FIG. 2B is a rear perspective view of a contact tip constructed in accordance with the teachings of the present disclosure;

FIG. 3 is a side view of various forms of the contact tip constructed in accordance with the teachings of the present disclosure;

DETAILED DESCRIPTION

Figure 1:
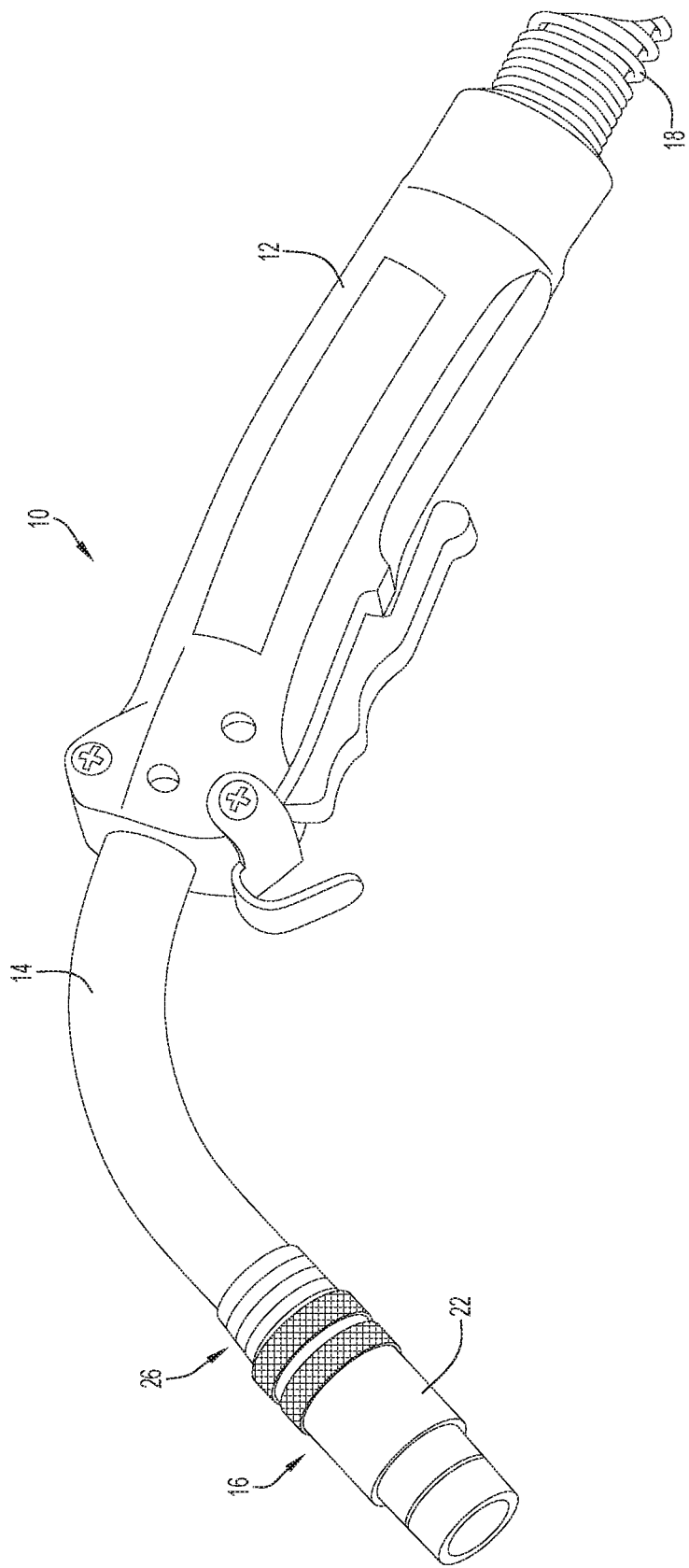
FIG. 1 is a perspective view of an arc welding apparatus constructed in accordance with the teachings of the present disclosure.

The following description is merely exemplary in nature and is in no way intended to limit the present disclosure or its application or uses. It should be understood that throughout the description and drawings, corresponding reference numerals indicate like or corresponding parts and features. And although the term "MIG" or "GMAW" is used throughout the specification, it should be understood that the teachings of the present disclosure apply to any type of welding or cutting apparatus.

Referring to FIG. 1, an arc welding apparatus, such as a MIG or GMAW welding gun, is illustrated and generally indicated by reference numeral 10. The MIG welding gun 10 includes a handle 12, a conductor tube 14 attached to the handle 12, and a consumable assembly 16 attached to the conductor tube 14. The handle 12 is connected to a welding cable 18 that carries welding current, shield gas, and a welding wire 20 from a power source (not shown), a gas source (not shown), and a wire feeder (not shown) to the welding gun 10.

The consumable assembly 16 includes a plurality of consumable components including a nozzle assembly 22 and a contact tip 24 (contact tip 24 is shown in latter FIGS.). The structure and operation of an exemplary arc welding apparatus has been disclosed in U.S. Pat. Nos. 5,491,321 and 5,338,917, which are commonly owned by the assignee of the present application, and the contents of which are incorporated herein by reference in their entirety.

The consumable assembly 16 is connected to a distal end portion 26 of the conductor tube 14. The nozzle assembly 22 is substantially cylindrical in one form and receives the distal end portion 26 of the conductor tube 14 therein. The contact tip 24 is coaxially disposed inside the nozzle insert 22 and may be secured therein as illustrated and described in copending U.S. application Ser. No. 13/674,829 titled "Hollow Contact Tip-Diffuser for GMAW Manual/Robotic Arc Welding MIG Guns," which is commonly owned with the present application and hereby incorporated by reference in its entirety. Further construction and operation of an exemplary arc welding apparatus for which the teachings of the present disclosure may be applied are also described in greater detail in the aforementioned copending application.

Referring to FIGS. 2-4, various forms of the contact tip 24 according to the present disclosure are now illustrated and described in greater detail. The contact tip 24 has a body 30 that defines an internal cavity 32 extending from a proximal end portion 34 to a distal end portion 36. The contact tip 24 has a distal end face 38 and an exit orifice 39 that extends through the distal end portion 36 of the body 30 and the distal end face 38. Advantageously, the contact tip 24 is designed to function as both a contact tip for transferring electric current to the welding wire and a gas diffuser for diffusing shield gas around the molten metal pool, thus providing a dual function while eliminating an additional component (i.e., a separate gas diffuser) from the consumable assembly 16.

As shown in FIG. 3, the length and configuration of the contact tips 24 can vary depending on application parameters such as amperage, wire diameter, duration of a welding operation, operating temperature, among other parameters associated with the environmental and specific welding application and welding process such as, by way of example, short arc, globular, spray transfer, and pulse. In addition, the length and configuration of the contact tips 24 may provide for customizing and improving the flow of shield gas and cooling of the contact tip 24 along with the surrounding nozzle assembly 22 for a specific welding operation. As shown, a shorter contact tip 24 is used for example in a light duty application, the contact tip in the center 24' for a medium duty application, and the contact tip at the bottom 24", for a heavy duty application. Typically, the duty cycle is determined by the duration of the weld operation and the amperage used during continuous operation of the welding gun. For example, a light duty application may be considered to be those welding operations that are rated and use approximately 250 amperes and below. A medium duty application may be considered to be welding operations with a range from approximately 250 amperes to approximately 350 amperes, and a heavy duty application is generally 350 amperes and above.

Figures 4A, 4B:
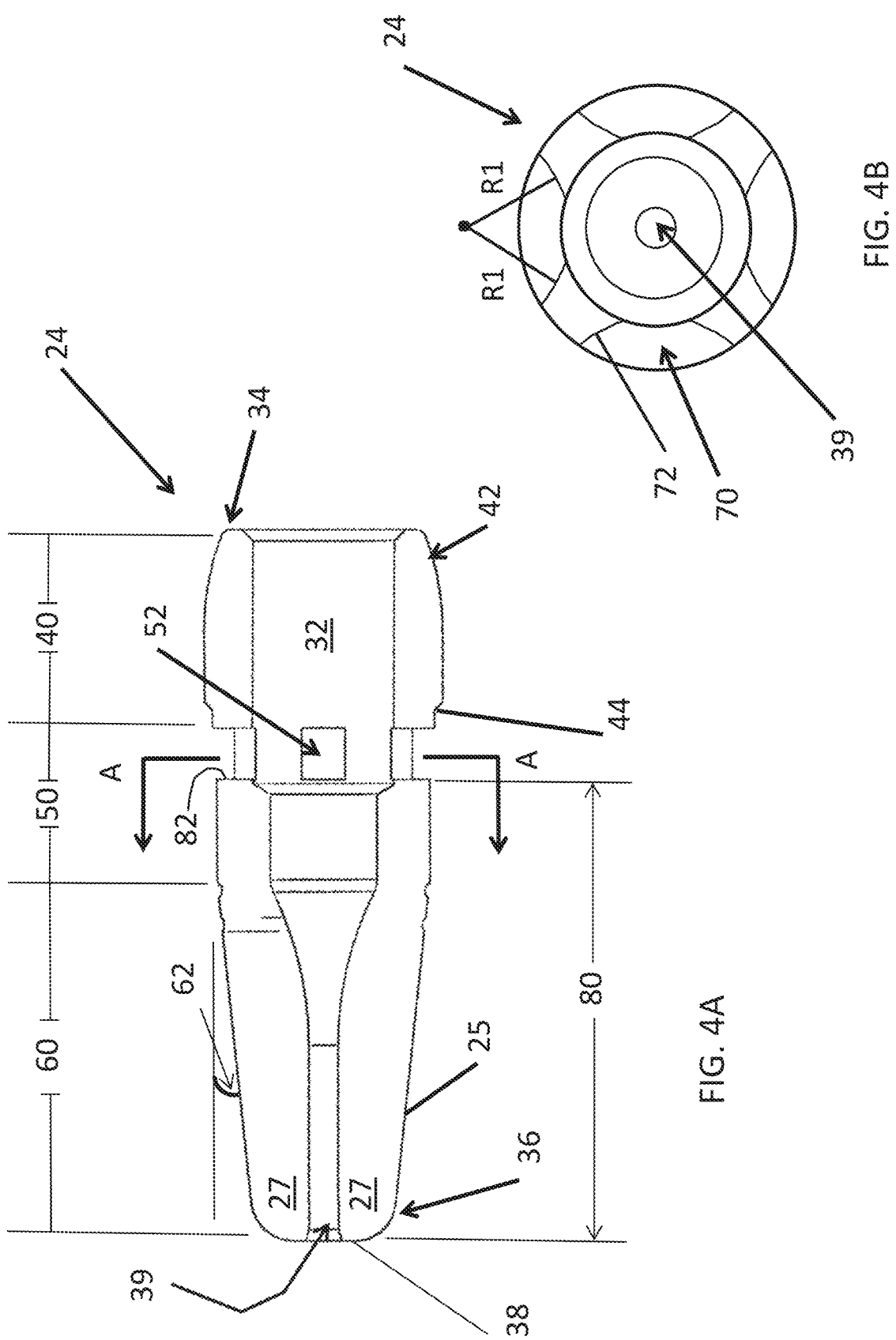
FIG. 4A is a side cross-sectional view of the contact tip constructed in accordance with the teachings of the present disclosure.
FIG. 4B is an end cross-sectional view of the contact tip, taken along line A-A of FIG. 4A, and constructed in accordance with the teachings of the present disclosure.

Referring now to FIG. 4A, the contact tip 24 according to one form of the present disclosure is further defined as having three sections, 40, 50, and 60. The first section 40 includes a spherical tapered end portion 42 for engaging a corresponding spherical tapered seat of a conductor tube (set forth above). Although a spherical taper geometry is shown, various other geometries may be used such as tapered or polygonal configuration for the contact connection between the contact tip 24 and a corresponding component such as a conductor tube. The spherical tapered end 42 tapers outward from the proximal end 34 toward the distal end portion 36. The first section 40 also defines a shoulder 44 as shown. The second section 50 is generally cylindrical and in one form defines at least one aperture 52 that extends through the body 30 into the internal cavity 32. Although the aperture 52 is shown in a rectangular/slotted configuration, it should be understood that any geometrical shape, such as by way of example, round, oval, polygonal may be employed while remaining within the scope of the present disclosure. Additionally, the apertures 52 may be normal to an outer surface 25 of the contact tip 24 or the apertures 52 may be angled in order to introduce a swirling action to the shield gas while remaining within the scope of the present disclosure. Additional details and function of the apertures 52 are set forth in copending U.S. application Ser. No. 13/674,829 titled "Hollow Contact Tip-Diffuser for GMAW Manual/Robotic Arc Welding MIG Guns," which has been incorporated by reference herein above.

A third section 60 in one form is tapered, and more specifically, tapering at an angle inward towards the distal end face 38 as shown. The third section 60 in this form tapers distally at a taper angle 62 from the second section 50 to the distal end face 38. The third section 60 may further include variations to the taper angle 62 to accommodate application variables such as the diameter of the exit orifice 39 of the contact tip 24 or a diameter of welding wire. By way of example, in one form of the present disclosure, the taper angle 62 varies between approximately 0-10 degrees. It should be understood that the length and/or configuration of each section 40, 50, 60 of the contact tip 24 may vary according to the specific welding application, such as by way of example, an extended tapered section 60 for reach small/tight welding locations, or a constant diameter contact tip throughout the second and third sections, 50, 60.

As previously set forth, the contact tip 24 includes at least one aperture 52 that extends through the body 30 of the contact tip 24 into the internal cavity 32. The contact tip 24 is designed to direct the shield gas into the internal cavity 32 at the proximal end portion 34, and then out through the apertures 52 toward the distal end portion 36, along an exterior surface 25 of the contact tip 24. The flow characteristics of the shield gas will vary with the shape and position of the apertures 52.

Referring more specifically to FIGS. 4A and 4B, in one form the contact tip 24 has four apertures 52 that are equally spaced as shown. The apertures 52 in this form are each generally rectangular shaped slots that are further defined by an arcuate cut-outs 70 into the body 30 of the contact tip 24. The arcuate cut-outs 70 form guiding surfaces 72 defined by a radius R1 on both sides of the aperture 52 that lead into the internal cavity 32. The arcuate shape of the guiding surfaces 72 direct the shield gas for a desired flow characteristic out of the aperture 52 of the contact tip 24. The apertures 52 may be any shape and the guiding surfaces 72 may further be adjusted and varied to change the flow characteristics of the shield gas for various applications. The number of apertures 52 and their spacing may be further modified to achieve a desired diffused flow of the shield gas. In one form, the total cross-sectional area of the apertures 52 is approximately equal to the total cross-sectional area of the gas input to the welding cable 18 at a power pin or plug holes (not shown). In this form, the apertures 52 are designed so that the total cross-sectional area does not restrict the flow of the shield gas beyond the restriction of the power pin or plug off of the gas supply (not shown). Additionally, the arcuate cut-outs 70 may be of various size radiuses R1. The size of the arcuate cut-outs 70 however, are generally sized to balance the desired conduction heat transfer properties between the sections of the contact tip 24 and the desired gas flow characteristics created by the guiding surfaces 72 as the shield gas exits the apertures 52. In the form illustrated, the radii R1 are approximately 5/32 inches.

Referring back to FIG. 4A, the flow of the shield gas through the apertures 52 can also be modified by varying the location of the apertures 52 along the body 30 of the contact tip 24. In one form the apertures 52 are located at a principal distance 80 measured from a distal edge 82 of the apertures 52 to the distal end face 38. The principal distance 80 can advantageously be varied to adjust the flow and cooling effect of the shield gas around the contact tip 24, along with flow characteristics of the shield gas exiting the nozzle assembly 22. The principal distance 80 between the apertures 52 to the distal end face 38 is at least a minimum distance to achieve the desired flow of the shield gas and the effectiveness of the shield gas to blanket the molten welding pool during the welding operation. The location of the apertures 52 in relation to the distal end face 38 allows for modifying the desired flow characteristics for each contact tip 24, to adjust operational variables such as by way of example, a flow volume or flow pattern of the shield gas from the internal cavity 32. In one form, the principal distance 80 is at the minimum distance of approximately 0.8 inches for the shield gas to achieve laminar flow properties along the exterior surface 25 of the contact tip 24. It should be understood that the principal distance 80 varies and could be greater or less than this value for different operating conditions, such as size of the contact tip, flow volume and other parameters specific to the welding application.

The taper angle 62 may further be modified to achieve a desired wall thickness 27 of the contact tip 24, proximate the distal end portion 36. The contact tip 24 and the desired wall thickness 27 may vary based on the diameter of the exit orifice 39 or the gauge of the welding wire. The wall thickness 27 is germane for heat transfer through the contact tip 24 and in some instances may dictate the taper angle 62, for example, with a larger diameter exit orifice 39. An insufficient wall thickness 27 may lead to increased/excessive local temperatures near the distal end portion 36 and premature degradation/decreased life of the contact tip 24, and more specifically a fusing or binding of the welding wire within the contact tip 24. Therefore, to prevent premature degradation, the wall thickness 27 of the contact tip 24 defines a minimum thickness that is dependent on the duty cycle and ampere rating of the welding operation. For example, in one form, the contact tip 24 for the heavy duty application dictates the wall thickness 25 to be approximately 0.12 inches. In another form, the contact tip 24 for a medium duty application dictates the wall thickness 27 of approximately 0.08 inches. Additional modifications may include adjusting the length of the second section 59 and the third section 60 to maintain the desired wall thickness 27 for a given gauge of welding wire. For example, in an instance of using a large gauge welding wire, the exit orifice 39 must be larger and the standard taper angle 62 may result in a wall thickness 27 that is too thin. Therefore, the taper angle 62 can further be changed to maintain the desired wall thickness 27 of the contact tip 24.

Figure 5:
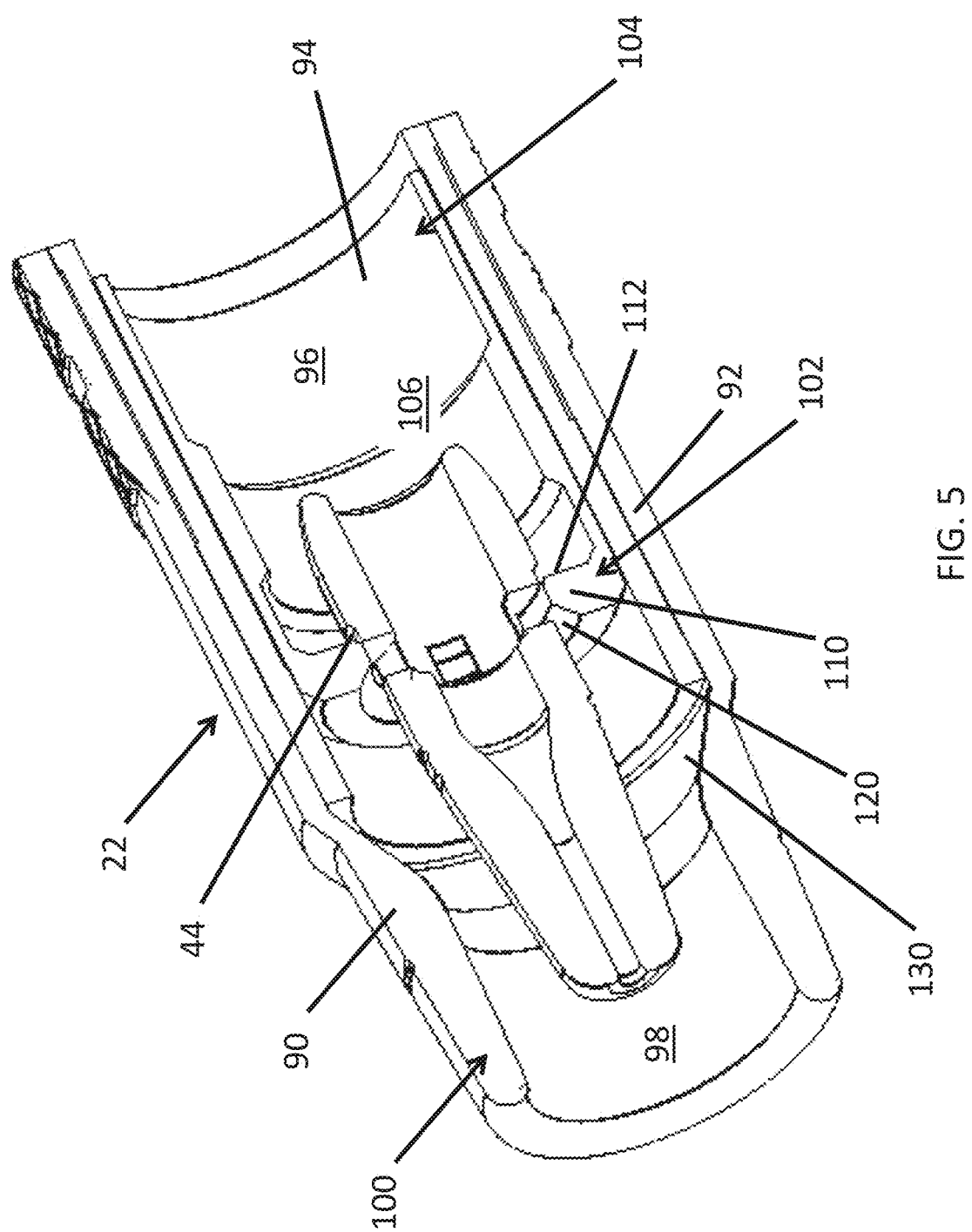
FIG. 5 is a partial perspective view of the contact tip disposed within a nozzle assembly constructed accordance with the teachings of the present disclosure.
Figure 6:
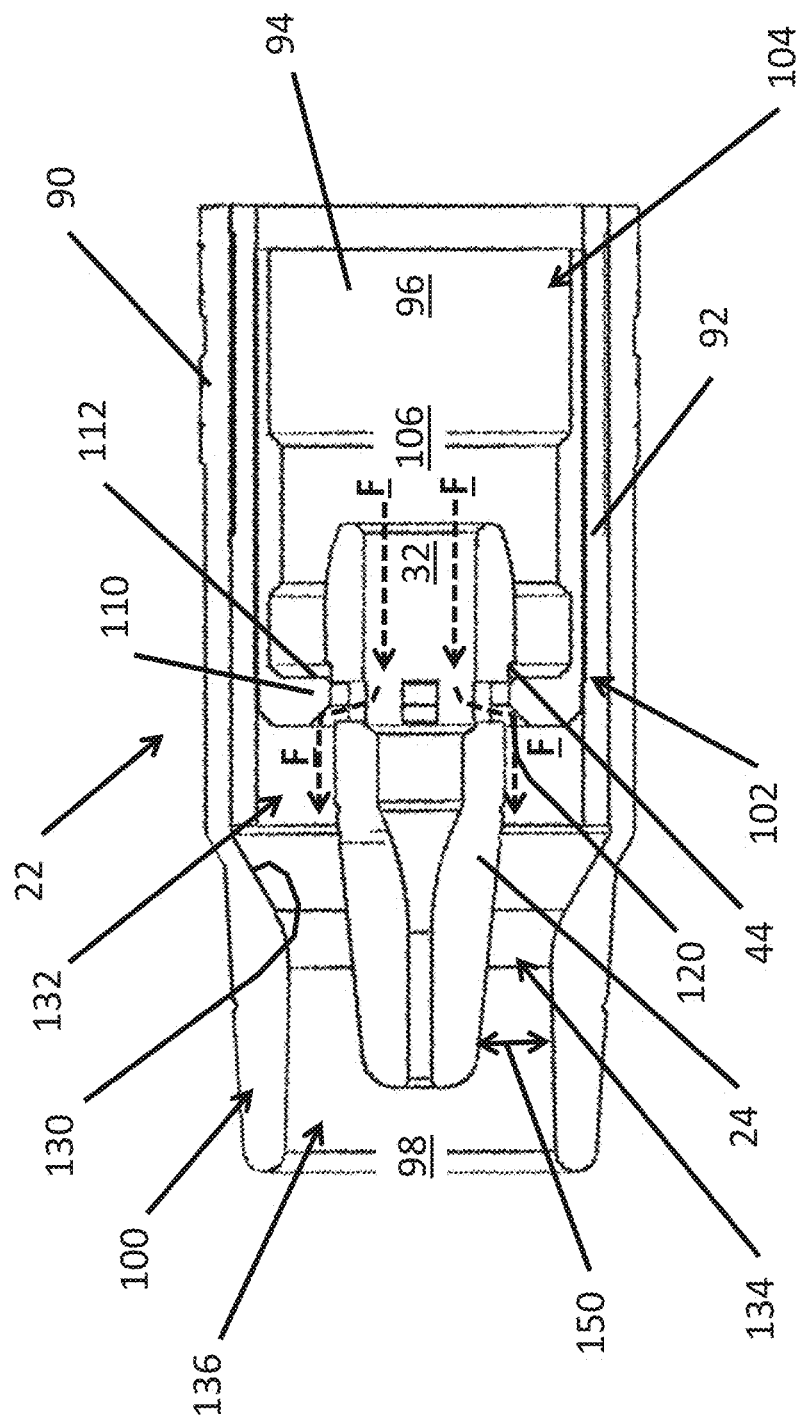
FIG. 6 is a side cross-sectional view of the contact tip and nozzle assembly of FIG. 5.

Referring to FIGS. 5 and 6, the nozzle assembly 22 includes a nozzle body 90 that is in one form generally cylindrical, an insulator 92, and a nozzle insert 94. As shown, the nozzle body 90 extends from a proximal opening 96 to a distal opening 98. The nozzle body 90 may further include a nose portion 100 that may or may not narrow/extend inwardly to properly direct the shield gas for a given application. The nozzle insert 94 has a proximal end portion 102 and a distal end portion 104 and includes a central bore 106 extending from the proximal end portion 102 towards the distal end portion 104. The nozzle insert 94 at its distal end portion 104 defines an internal gas diverter 110. The internal gas diverter 110 further defines a seating surface 112 toward the proximal end portion 102 of the nozzle insert 94. The seating surface 112 is chamfered in one form, for engaging the shoulder 44 of the contact tip 24. (The shoulder 44 of the contact tip 24 is shown spaced apart from the seating surface 112 in order to illustrate these features in detail). As further shown, the internal gas diverter 110 defines a profiled diverter orifice 120 that extends distally from the central bore 106.

The nozzle body 90 may further include an interior diverter surface 130 for further directing the shield gas exiting the apertures 52 of the contact tip 24. In this form, the shield gas flow is directed by the interior diverter surface 130 within a convergent section 132 into a throat 134, and then the shield gas enters a divergent section 136 of the nozzle body 90. In this form, the divergent section 136 has an increasing diameter from the throat 134 to a distal opening 98 of the nozzle body 90. The nozzle body 90 including both the convergent section 132 and the divergent section 136 results in flow characteristics that are more laminar when exiting the distal opening 98. In addition, the divergent section 136 directs the shield gas out the distal opening 98 to fan outward, widening the coverage of the shield gas over the weld pool during the operation of the welding gun 10. The convergent and divergent sections 132, 136 are designed to further improve and customize the flow characteristics of the shield gas for the specific welding operation. The lengths, diameters and interior geometry of the nozzle body 90 may include various permutations to allow for the shield gas to be optimized for a specific welding operation and environment. For example, the divergent section 136 may extend at a greater angle from the throat 134, further directing the shield gas into a larger fan outward of the distal opening 98. Alternately, the divergent section 136 may extend at or near the same diameter as the throat 134, thus directing the shield gas in a narrower fan exiting the distal opening 98.

As further shown, the design of the contact tip 24 and the third section 60 may further include various application specific designs to control a spacing 150 between the nozzle body 90 and the exterior surface 25 of the contact tip 24, in order to control flow of the shield gas therein. The spacing may be normal to the exterior surface 25 of the contact 24 and may also be located at any position along the length of the contact tip 24.

As shown in FIGS. 5 and 6, the profiled diverter orifice 120 of the nozzle insert 94 extends around the apertures 52 of the contact tip 24. The gas flow, indicated by the dashed arrows F, is directed distally through the internal cavity 32 of the contact tip 24, and then radially outwards through the apertures 52. The profiled diverter orifice 120 then directs the gas flow exiting the apertures 52 distally around the exterior surface 25 of the contact tip 24 as shown. The profiled diverter orifice 120 may extend various lengths from a contact seat 160 and include a variety of geometries, in addition to the chamfered configurations as illustrated herein. Alternately, the profiled diverter orifice 120 may extend at any angle that will change the direction of the shield gas to improve the flow characteristics or cooling of the contact tip 24 and surrounding nozzle assembly 22. For example, such flow characteristics may include a laminar flow along the length of the contact tip 24.

Figure 7:
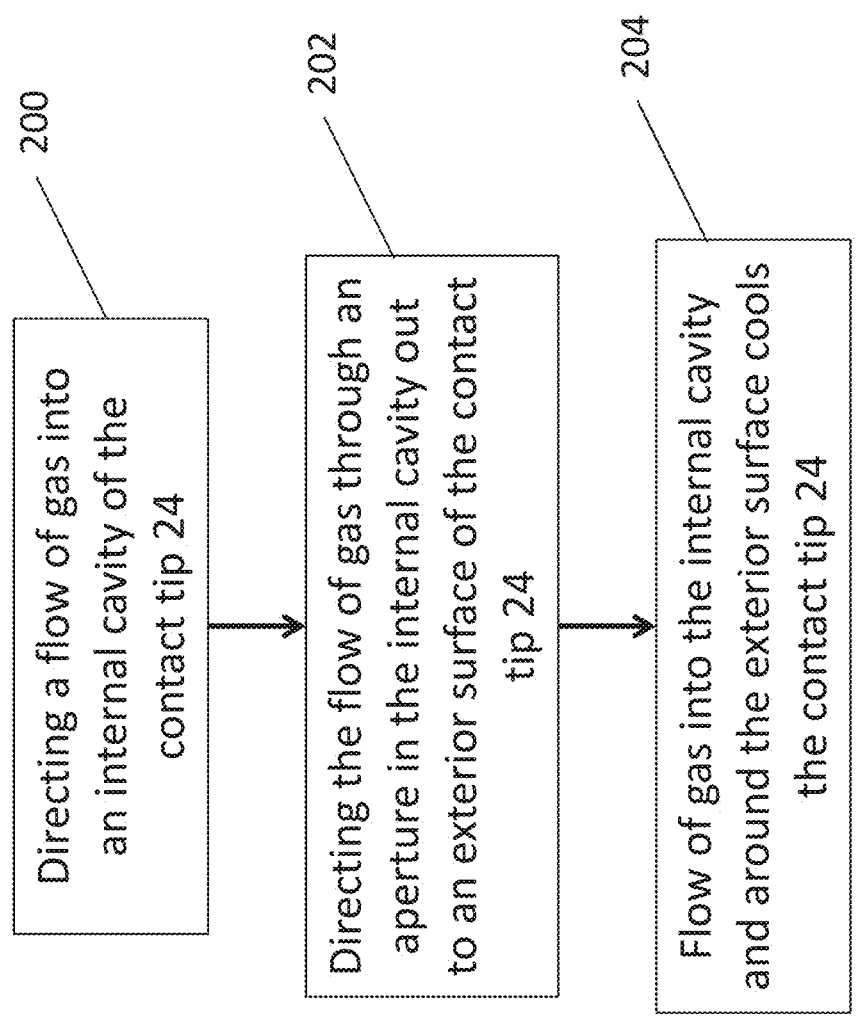
FIG. 7 is a flow diagram illustrating a method according to the teachings of the present disclosure.

Referring to FIG. 7, the present disclosure also includes a method for cooling the contact tip 24 includes a first step 200 of directing shield gas to flow into the internal cavity 32 of the contact tip 24. A second step 202 includes directing the shield gas flow from the internal cavity 32 through the at least one aperture 52 to the exterior surface 25 of the contact tip 24. A third step 204 provides cooling of the contact tip 24 by directing the flow of shield gas into and through the internal cavity 32 and around the exterior surface 25 of the contact tip 24. The cooling further includes both a conduction heat transfer and convection heat transfer to reduce the operating temperature of the contact tip 24 and the overall consumable assembly 16.

The method of cooling and the design of the contact tip 24 in combination with the nozzle assembly 22 may further reduce the temperature by changing the volume of gas flow, for example by having a different aperture shape or number of apertures 52. Another aspect to the cooling of the contact tip 24 involves the conductive heat transfer within the welding gun 10. Therefore, variations to the contact area between the contact tip 24 and the seat within the conductor tube may further provide cooling of the contact tip 24 by changing the conductive heat transfer to the conductor tube. Variations to the spherical taper end 42 and the spherical tapered seat of the conductor tube may further reduce the operating temperature and the thermal effects of the welding operation to improve the life of the contact tip 24 and the overall consumable assembly 16.

In testing various forms of the present disclosure, the operating temperature of the contact tip 24 has been reduced by more than 30%. This reduced operating temperature increases overall life and also reduces adhesion of weld splatter onto the contact tip 24.

Figure 8:
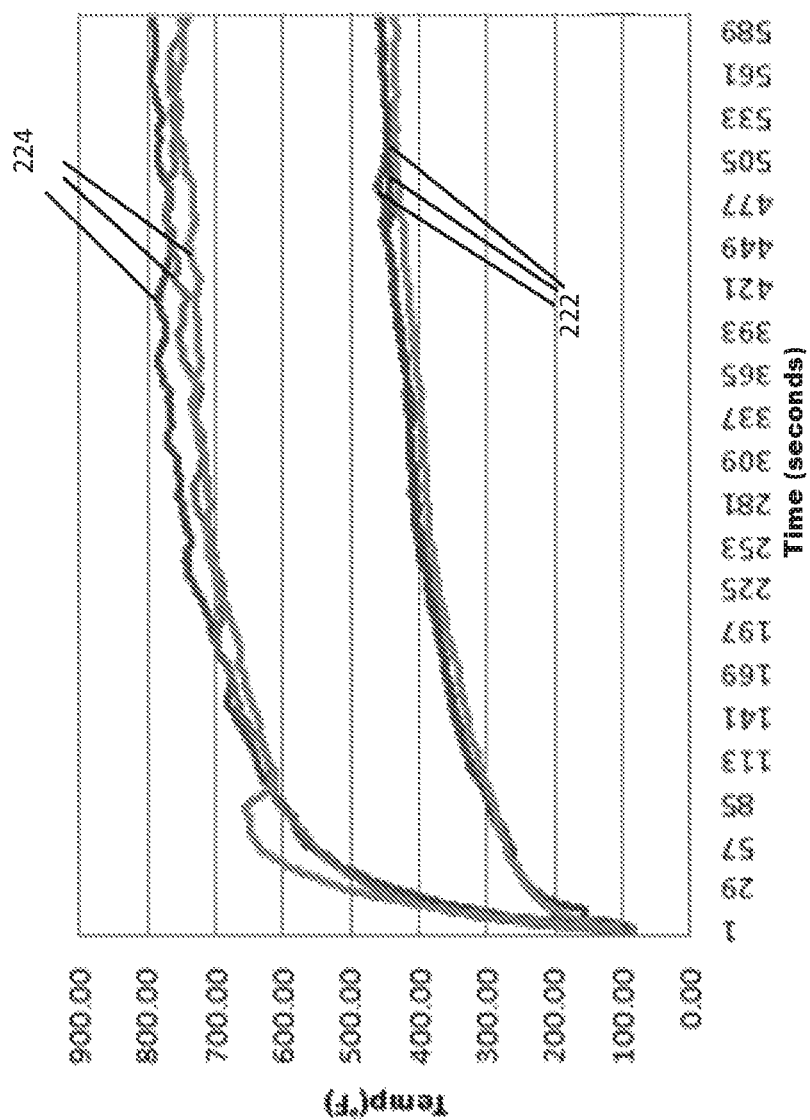
FIG. 8 is a graph showing experimental test data for operating temperature vs. duty cycle for a standard welding contact tip (using 16 gauge welding wire) versus one form of the contact tip of the present disclosure.

Referring to FIG. 8, test results demonstrating lower operating temperature for the present disclosure are illustrated, which employed the following welding parameters in Table 1 below.

TABLE 1

| Welding Parameters for Testing | |
|---|---|
| Test Duration | 10 Minutes |
| Wire Size | 1/16" (16 gauge wire) |
| Current | 360 Amperes |
| Voltage | 26.2 Volts |
| Contact Tip to Work Distance | 3/4" |

The testing included a total of six (6) runs using the welding parameters above. Three (3) the runs used a conventional welding tip, and the operating temperatures for each of these three (3) runs are indicated by lines 224. The other three (3) runs employed the contact tip 24 and nozzle body assembly 22 according to the present disclosure, for a heavy duty application, and operating temperatures for each of these runs are indicated by lines 222. This testing demonstrated that the operating temperature of the contact tip 24 according to the teachings of the present disclosure was more than 300° F. cooler than a conventional contact tip, as shown Table 2 below.

TABLE 2

| Average Maximum Temperature | | |
|---|---|---|
| Contact Tip >> | Heavy Duty Contact Tip 24 | Conventional Welding Tip |
| Average Max. Temp (° F.) | 457.77 | 775.58 |
| Temperature Difference (° F.) | 317.81 | |

The present disclosure is merely exemplary in nature and, thus, variations that do not depart from the spirit of the disclosure are intended to be within the scope of the present disclosure. Such variations are not to be regarded as a departure from the scope contemplated in the present disclosure.

What is claimed is:

1. An arc welding apparatus comprising:
   a handle;
   a conductor tube attached to the handle;
   a welding cable that carries welding current, shield gas, and a welding wire, the welding cable being connected to the handle; and
   a consumable assembly attached to the conductor tube, the consumable assembly comprising:

a nozzle assembly comprising a nozzle body, an insulator disposed within the nozzle body, and a nozzle insert disposed within the insulator, the nozzle insert comprising an internal gas diverter and a seating surface; and a contact tip disposed within the nozzle assembly, the contact tip defining a shoulder that engages the seating surface of the nozzle insert, and the contact tip further comprising:
  a body defining an internal cavity extending from a proximal end portion to a distal end portion;
  at least one aperture extending from an exterior portion of the body to the internal cavity;
  an exit orifice extending through the distal end portion of the body;
  a distal end face; and
  an exterior surface extending between the at least one aperture and the distal end portion of the body,
wherein the internal gas diverter directs a flow of shield gas exiting the at least one aperture along the exterior surface of the contact tip.

2. The arc welding apparatus according to claim 1, wherein the internal gas diverter defines a profiled diverter orifice.

3. The arc welding apparatus according to claim 1, wherein a spacing is defined between the distal end portion of the contact tip and a nose portion of the nozzle body, and the spacing is configured to control the flow of shield gas.

4. The arc welding apparatus according to claim 1, wherein the nozzle body further comprises an interior diverter surface to further direct the flow of shield gas.

5. The arc welding apparatus according to claim 1, wherein the nozzle body further comprises an internal divergent section along a nose portion thereof.

6. The arc welding apparatus according to claim 1, wherein the at least one aperture defines an arcuate cut-out having guiding surfaces, wherein the guiding surfaces direct the flow of shield gas for a desired flow characteristic out of the at least one aperture.

7. The arc welding apparatus according to claim 6, wherein the contact tip is removably disposed within the nozzle assembly.

8. The arc welding apparatus according to claim 1, wherein the at least one aperture is four apertures that are equally spaced circumferentially around the body of the contact tip.

9. The arc welding apparatus according to claim 1, wherein a portion of the body of the contact tip tapers at an angle inward towards the distal end face, the angle being between 0-10 degrees.

10. The arc welding apparatus according to claim 1, wherein a volume flow through the at least one aperture is a function of a distance from the at least one aperture to the distal end face.

11. An arc welding apparatus comprising:
a handle;
a conductor tube attached to the handle;
a welding cable that carries welding current, shield gas, and a welding wire, the welding cable being connected to the handle; and
a consumable assembly attached to the conductor tube, the consumable assembly comprising:
  a nozzle assembly comprising a nozzle body and a nozzle insert disposed within the nozzle body, the nozzle insert comprising an internal gas diverter and a seating surface; and
  a contact tip disposed within the nozzle assembly, the contact tip comprising:
    a body defining an internal cavity extending from a proximal end portion to a distal end portion;
    a shoulder formed on the body, the shoulder engaging the seating surface of the nozzle insert when disposed within the nozzle assembly;
    at least one aperture disposed on the body between the shoulder and the distal end portion, the at least one aperture extending through the body from an exterior portion of the body to the internal cavity;
    an exit orifice extending through the distal end portion of the body; and
    an exterior surface extending between the at least one aperture and the distal end portion of the body,
  wherein the internal gas diverter directs a flow of shield gas exiting the at least one aperture along the exterior surface of the contact tip.

12. The arc welding apparatus according to claim 11, wherein the nozzle insert has a proximal end portion, a distal end point, and a central bore extending from the proximal end portion towards the distal end point.

13. The arc welding apparatus according to claim 12, wherein the internal gas diverter defines a profiled diverter orifice extending distally from the central bore of the nozzle insert such that the profiled diverter orifice extends around the at least one aperture.

14. The arc welding apparatus according to claim 11, wherein the at least one aperture is four apertures that are equally spaced circumferentially around the body of the contact tip.

15. The arc welding apparatus according to claim 11, wherein the nozzle body further comprises:
an interior diverter surface to further direct the flow of shield gas; and
a divergent section proximate to a distal end of the nozzle body, the divergent section having an increasing diameter towards a distal opening of the nozzle body that directs the shield gas out of the distal opening.

16. The arc welding apparatus according to claim 11, wherein the contact tip is removably disposed within the nozzle assembly.

17. The arc welding apparatus according to claim 11, wherein the at least one aperture defines an arcuate cut-out having guiding surfaces, wherein the guiding surfaces direct the flow of shield gas for a desired flow characteristic out of the at least one aperture.

18. The arc welding apparatus according to claim 11, wherein a wall thickness of the body of the contact tip proximate to the distal end portion of the body is a function of a welding wire diameter that extends through the exit orifice.

19. The arc welding apparatus according to claim 11, wherein a portion of the body of the contact tip tapers at an angle inward towards the exit orifice at an angle between 0-10 degrees.

20. The arc welding apparatus according to claim 11, wherein a volume flow through the at least one aperture is a function of a distance from the at least one aperture to the exit orifice.

* * * * *